United States Patent
Cuevas

[11] 3,789,059
[45] Jan. 29, 1974

[54] METHOD OF PRODUCING HIGH PURITY LITHIUM CHLORIDE

[75] Inventor: Ephraim A. Cuevas, Corpus Christi, Tex.

[73] Assignee: PPG Industries, Inc., Pittsburgh, Pa.

[22] Filed: Mar. 31, 1972

[21] Appl. No.: 240,087

Related U.S. Application Data

[63] Continuation of Ser. No. 54,408, July 13, 1970, abandoned.

[52] U.S. Cl............. 260/437 R, 423/499, 423/561, 423/562
[51] Int. Cl. ............................................. C07f 7/24
[58] Field of Search . 260/437 R; 423/499, 561, 562

[56] References Cited
UNITED STATES PATENTS

| | | | |
|---|---|---|---|
| 3,631,190 | 12/1971 | Cortez | 260/437 R |
| 2,703,272 | 3/1955 | Fuchsman | 423/198 |
| 2,018,438 | 10/1935 | Christensen | 423/93 |
| 2,060,108 | 11/1936 | Oberseider et al. | 423/93 |
| 2,448,516 | 9/1948 | Cashman | 338/18 |
| 1,549,062 | 8/1925 | Christensen | 423/94 |

FOREIGN PATENTS OR APPLICATIONS

813,925   5/1969   Canada

OTHER PUBLICATIONS

Mellor, A Comprehensive Treatise an Inorganic and Theoretical Chem., Longman Green, N.Y, Vol. 2, pp. 66–67 (1922).

*Primary Examiner*—Helen M. S. Sneed
*Attorney, Agent, or Firm*—Chisholm and Spencer

[57] ABSTRACT

A method of producing high purity lithium chloride suitable for use in the manufacture of high purity lithium metal is described. Lithium chloride produced in accordance with the described method is recovered from aqueous solutions of lithium chloride produced in the manufacture of tetraalkyllead from metallic lithium, metallic lead and alkyl halides. The specification describes a lithium chloride evaporation system in which the lead concentration of the evaporator is maintained at a level of 0.3 percent by weight lead or less to produce high purity lithium chloride crystals. Maintenance of the lead concentration during the evaporation of the lithium chloride solution at this level produces a lithium chloride crystal containing 99 percent by weight lithium chloride or more. These crystals are found to contain less than 100 parts per million lead. Two specific methods for controlling the concentration of the lead in the evaporator are shown; one involving the precipitation of lead hydroxy chloride [Pb(OH)Cl] from the circulating solutions and the other providing for a hydrogen sulfide treatment of evaporator bleed streams to maintain the lead level constantly below the 0.3 percent weight level.

16 Claims, 3 Drawing Figures

METHOD OF PRODUCING HIGH PURITY LITHIUM CHLORIDE

This is a continuation of application Ser. No. 54,408, filed July 13, 1970 now abandoned.

BACKGROUND OF THE INVENTION

In Canadian pat. No. 813,925 a process is described for the manufacture of tetraalkyllead compounds. The reaction conducted therein may be conveniently illustrated by the following equation:

$$Pb + 4Li + 4RX \rightarrow Pb(R)_4 + 4LiX$$

wherein RX represents a hydrocarbon halide, X represents chloride, bromine and/or iodine and R represents an unsubstituted alkyl, alkenyl or aryl group.

In this process the product mass produced in the reactor, typically an autoclave, is contacted with water to dissolve the lithium halide content thereof. The tetraalkyllead component of the product mass is subsequently steam distilled and recovered. The aqueous solution of lithium halide produced by the contact of the product mass with water is found to contain substantial quantities of dissolved lead in addition to high concentrations of lithium halide and lithium hydroxide. Normally these solutions are treated as described in the aforementioned Canadian patent to recover lithium halide crystals. These crystals are then subjected to electrolysis to produce metallic lithium for use in the initial reaction for producing tetraalkyllead. In order to properly electrolyze lithium halide to produce metallic lithium, it has been found that the lithium halide should contain less than 100 parts per million lead. Thus, for example, lithium chloride crystals subjected to electrolysis produce high purity lithium metal efficiently when the lead content of the crystals is below 90 parts per million. When concontaminated with lead above this concentration, deleterious results occur.

THE INSTANT INVENTION

In accordance with the instant invention, the maintenance of the lead concentration below 100 parts per million in lithium halide crystals recovered from lithium halide solutions containing substantial quantities of dissolved lead therein (that is more than 0.4 percent by weight lead) is provided by controlling the lead concentration of the evaporation system from which such crystals are precipitated by maintaining in the evaporation liquor a lead concentration of less than 0.3 percent by weight. In particular, by reducing in a lithium chloride solution containing more than 0.4 percent lead by weight the lead content to less than 0.3 percent by weight lead and then crystallizing lithium chloride therefrom a lithium chloride crystalline product containing less than 90 parts per million lead is produced.

Several alternative methods may be employed to reduce and maintain the lead concentration at the desired level but the important consideration is that the weight percentage of lead contained in the lithium chloride solutions from which the crystals are precipitated must be maintained at a level at or below 0.3 percent by weight lead.

For a more complete understanding of the present invention, reference is made to the accompanying drawings in which.

Figure 1:
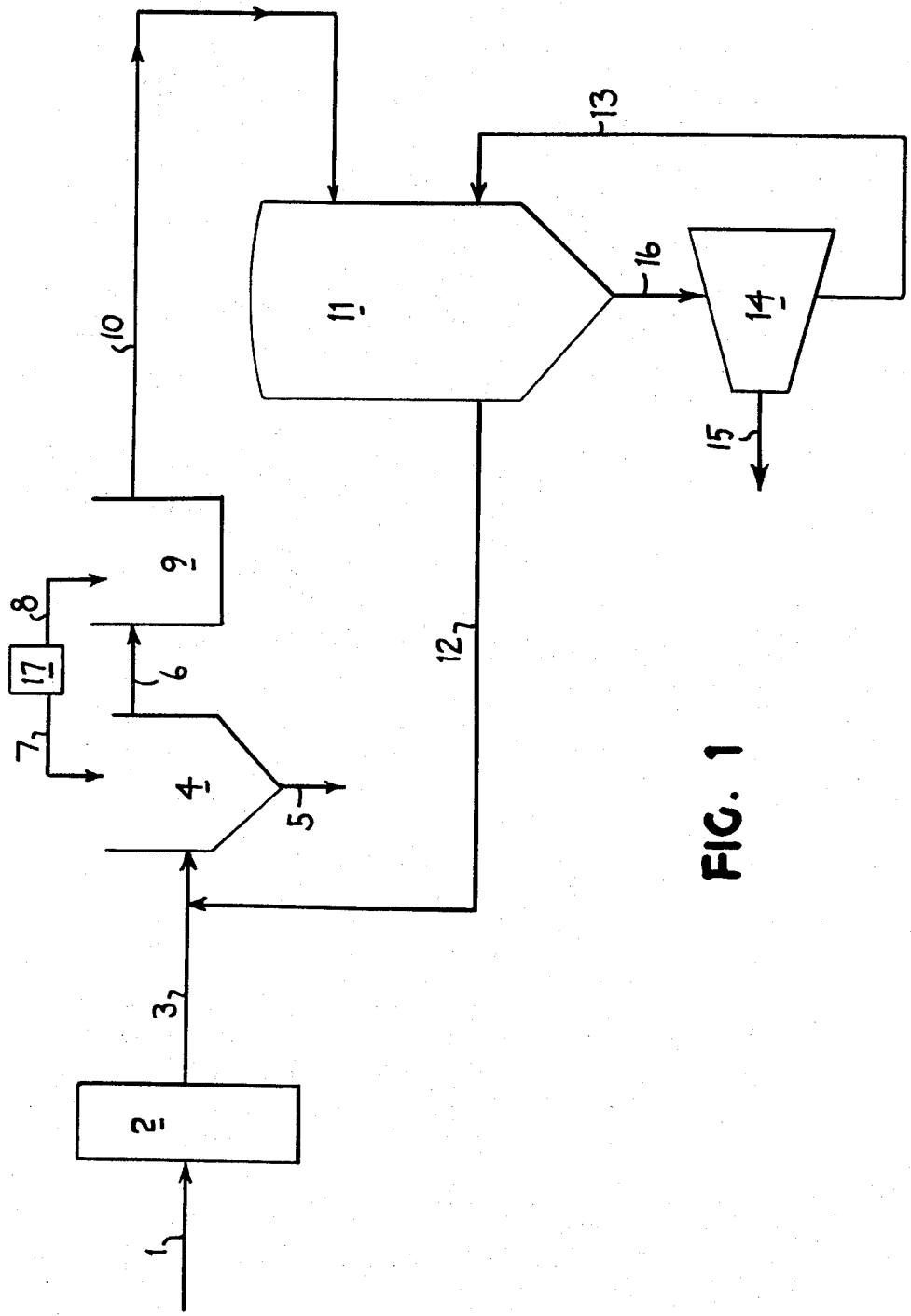
FIG. 1 shows a flow sheet illustrative of one method of controlling the lead concentration in an evaporation system by precipitation of the lead contained in the solutions as a lead hydroxy chloride.

Turning now to the drawings to illustrate the instant invention and FIG. 1 in particular, there is shown a lithium chloride solution containing contaminating quantities of dissolved lead therein, that is more than 0.4 weight percent of lead, being introduced from a tetraalkyllead production operation to a storage tank 2. The lithium chloride solution in the storage tank 2 is fed via line 3 to a treatment tank 4. The treatment tank 4 is provided with a discharge line 5 and additional feed line 7. Also connected to the line 3 is a line 12 communicating with an evaporator-crystallizer 11. The solution from tank 4 discharges via line 6 into a second tank 9 which also is provided with a second feed inlet 8. Both feed inlets 7 and 8 are in communication with an acid storage tank 17. The liquid solution from tank 9 is fed via line 10 to the evaporator-crystallizer 11. Evaporator-crystallizer 11 is equipped with discharge line 16 which is connected to a centrifuge 14. Centrifuge 14 is equipped with a discharge line 15 for the discharge of product crystals and a second discharge line 13 for the recirculation of liquors to the evaporator-crystallizer 11.

In the preparation of lithium chloride crystals of high purity in accordance with the scheme shown in FIG. 1, a lithium chloride solution containing contaminating quantities of lead (more than 0.4 percent by weight) is fed through line 3 to the tank 4. The solution is typically alkaline as it is supplied to the tank 4. The tank 4 is fed with an acid, preferably hydrochloric acid, from storage tank 17 via line 7 on a continuous or discontinuous basis depending on whether or not the feed from line 3 to the tank 4 is continuous or discontinuous. Sufficient acid is added to maintain a hydroxyl ion concentration in tank 4 of between 2 and 8 milliequivalents per 100 grams of solution. Maintenance of the hydroxyl ion concentration in tank 4 within these limits provides for the maximum precipitation of lead hydroxy chloride from the solutions fed thereto. Should solution in tank 4 be acid or neutral, an alkali, for example, aqueous alkali metal or alkaline earth metal hydroxide may be used to establish the desired hydroxyl ion concentration.

Figure 2:
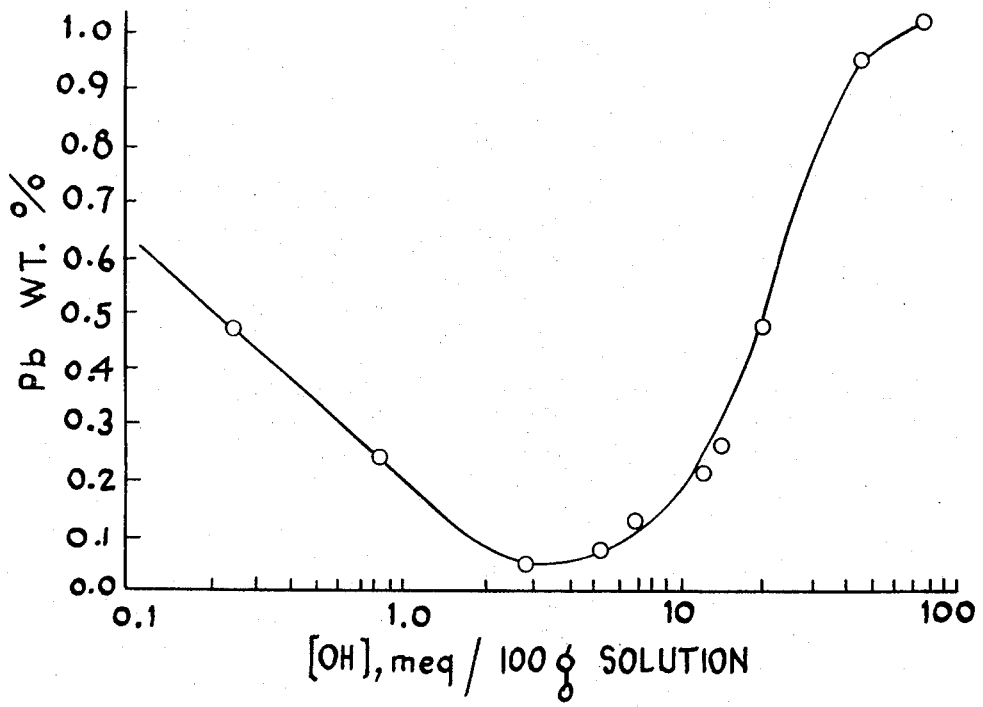
FIG. 2 shows a curve depicting the effect of hydroxyl ion concentration on the solubility of lead in lithium chloride solution.

FIG. 2 shows by means of a curve the solubility of lead in a lithium chloride solution on the basis of hydroxyl ion concentration. As can be appreciated by examination of the curve, at milliequivalent concentrations between 2 and 8, and preferably between 2.8 and 4.5, the lead concentration of a lithium chloride solution entering can be reduced to below 0.1 percent by weight.

Applying this principle to the feed to tank 4, a solution is discharged from tank 4 via line 6 which contains essentially lithium chloride and lithium hydroxide and less than 0.2 percent by weight lead.

This solution is fed to tank 9 where it is further acidified by the addition of more acid from tank 17 via line 8 to provide a hydroxyl ion concentration in the solution discharged via line 10 of at least 0. Thus, the solution entering evaporator 11 via line 10 is essentially pure lithium chloride containing less than 0.2 percent lead by weight. In evaporator-crystallizer 11 the solution is concentrated to a lithium chloride concentration of above 56 percent by weight. In this vessel 11 crystals of lithium chloride are produced. A constant slurry stream is removed via discharge line 16 to a centrifuge 14. Crystals produced from a solution of lithium chloride containing above 56 percent by weight lithium chloride and 0.3 percent or less lead by weight are found to contain 99.4 percent lithium chloride by weight and less than 90 parts per million lead. The liquor from centrifuge 14 is recirculated to the evaporator-crystallizer 11 via line 13. Periodically or continuously depending on whether the process is run batch or continuous, a recycle stream is removed from the evaporator-crystallizer 11 via line 12. This recycle stream typically represents at least 5 percent by weight of the material contained in the evaporator-crystallizer vessel 11. This recycle stream is fed into the first treatment tank 4 where its lead constituents can be precipitated during the adjustment of the hydroxyl ion concentration of the solution fed thereto. Operating in this manner, the lead concentration in the evaporator-crystallizer vessel 11 is maintained at a 0.3 percent by weight level or less continuously to insure the production of a high purity lithium chloride crystal in the evaporator-crystallizer 11, that is, a lithium chloride crystal containing less than 90 parts per million lead.

Figure 3:
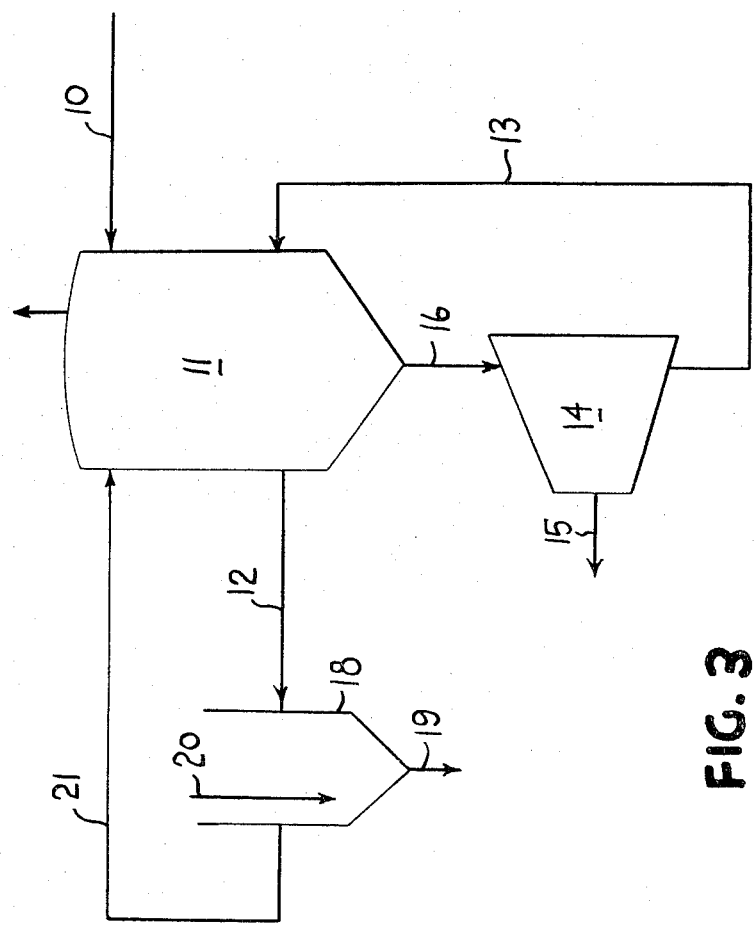
FIG. 3 represents an alternative scheme for maintaining a low concentration of lead in an evaporation system from which lithium chloride is being produced.

FIG. 3 shows an alternative scheme for maintaining in evaporator-crystallizer 11 solutions having lead concentrations at or below the 0.3 percent by weight level. Thus, in FIG. 3, evaporator-crystallizer 11 is connected via line 12 to vessel 18 having a gas inlet line 20 and a solids discharge line 19. A liquor recycle line 21 is also connected to vessel 20 and evaporator-crystallizer 11. The evaporator-crystallizer 11 in FIG. 3 is connected via line 16 to the centrifuge 14 supplied with discharge line 15 for product. A recirculation line 13 is also provided in centrifuge 14 for the recirculation of liquor to evaporator-crystallizer 11. Line 10 entering the evaporator-crystallizer 11 is the feed line for the introduction of the lithium chloride solutions from the tank 9 (not shown) in FIG. 3.

In this alternative scheme to maintain in the crystal recovered from the centrifuge 14 a concentration of 90 parts per million lead or less, a portion of the evaporator liquor is recycled via line 12 to treatment tank 18. In the treatement tank 18, hydrogen sulfide is continuously passed via line 20 through the liquor fed thereto to convert dissolved lead contained in the recycle streams to lead sulfide. The lead sulfide is removed via line 19 and the resulting lithium chloride solution, substantially depleted of its lead content, is recycled directly to the evaporator-crystallizer 11. In this manner, by correlating the quantity of recycle liquor to the lead contained in the solution in evaporator-crystallizer 11, a lead concentration is readily maintained in the vessel 11 at the 0.3 percent by weight level. This control insures the production of high purity lithium chloride crystals. If desired, in lieu of the hydrogen sulfide used in tank 18 to supply the sulfide ions for the lead contaminants contained in the solution in that tank, alkali metal sulfides may be used for this purpose. In this modification a solution containing preferably lithium sulfide may be introduced via line 20 to the vessel 18.

The lead chlorides contained in the solution fed to vessel 18 via line 12 are readily converted to lead sulfide by contact therein with the lithium sulfide. Solutions having low lead concentrations issuing from tank 18 are recycled via line 21 to evaporator-crystallizer 11 and in this manner high purity lithium chloride solutions are constantly maintained in evaporator-crystallizer 11.

The acid normally used in the embodiment of FIG. 1 is a strong mineral acid, typically hydrochloric, phosphoric or nitric. Strong organic acids such as acetic and oxalic acids may also be used. It is preferred in this embodiment that hydrochloric acid in concentrated form be employed since this reduces considerably the evaporation load on the system and provides chloride ions to the overall system.

In the embodiment shown in FIG. 3, when an alkali metal sulfide is used as a feed to tank 18, it is preferably lithium sulfide through other alkali metal sulfides could be employed. This lithium or other alkali metal sulfide is fed to the vessel 18 preferably dissolved in a lithium chloride solution. A typical solution for the purpose of precipitating the dissolved lead in the solutions treated contains 2 to 15 percent lithium sulfide by weight of the solution.

The treatment of the solution in tanks 4 and 9 of FIG. 1 are generally conducted at ambient temperature (25°C.) though it would be permissible to operate at temperatures above or below ambient temperature. The only limiting factors would be the boiling point and freezing point of the solutions treated and the extent to which these points would limit operation.

The quantity of liquor recycled in streams contained in line 12 can be varied as desired and will depend upon the operation of evaporator-crystallizer 11 and the quantities of lead in the solution contained in evaporator-crystallizer 11. The rate of recycle through the precipitation stages shown in FIGS. 1 and 3 will depend upon the weight percent of lead built up in evaporator-crystallizer 11 as water is driven off from the solution contained therein. So long as the weight percent of lead in the solution in evaporator-crystallizer 11 is maintained at 0.3 percent or below, satisfactory product is recovered from the crystallizer.

The following examples illustrate typical operation of the instant invention to produce high purity lithium chloride from lithium chloride solutions containing substantial quantities of lead.

EXAMPLE I

A lithium chloride aqueous solution containing 29.6 percent lithium chloride, 1.4 percent lithium hydroxide, 0.19 percent sodium chloride and 0.66 percent lead as dissolved lead compounds is treated in accordance with the process scheme illustrated in FIG. 1. The said solution of lithium chloride is thus fed from storage vessel 2 through line 3 in continuous flow to tank 4. Also fed to tank 4 on a continuous basis is a recycle steam from line 12 which contains 56 percent by weight lithium chloride, 0.39 percent by weight sodium chloride and 0.3 percent by weight dissolved lead. The solution in tank 4 is at temperature of about 45°C. and is adjusted to a pH of 12 therein by the continuous addition of concentrated hydrochloric acid (37 percent HCl by weight) from tank 17 being admitted to tank 4 via line 7. Lead hydroxy chloride [Pb(OH)Cl] is precipitated in tank 4 and is removed via line 5. The solution is passed continuously from tank 4 via line 6 to tank 9 where additional hydrochloric acid is added to the solution to adjust the pH to 7 therein. The pH adjustment in tank 9 converts essentially all the lithium hydroxide to lithium chloride and the solution passed continuously through line 10 to evaporator-crystallizer 11 contains about 40 percent lithium chloride, 0.26 percent sodium chloride and 0.114 percent dissolved lead by weight. This solution is passed continuously to evaporator-crystallizer 11 which is maintained with a constant volume of about 16.7 liters of solution at a temperature of about 110°C. Approximately 2,266 grams of water per hour are evaporated from the vessel 11 under these conditions. 8.8 percent by weight of the material entering vessel 11 is recycled via line 12 to line 3 on a continuous basis for feed to vessel 4. The solution concentration in vessel 11 under these conditions of operation is maintained at 56 percent lithium chloride, 0.39 percent sodium chloride and 0.3 percent dissolved lead by evaporating water from it. A slurry from this vessel is continuously fed to the centrifuge 14 via line 16. The liquor recovered from the centrifuge 14 is recycled in line 13 to evaporator-crystallizer 11. The crystals of lithium chloride recovered from the centrifuge 14 have the following composition:

|  | Wt. % |
|---|---|
| Lithium chloride | 99.4 |
| Sodium chloride | 0.58 |
| Lead | 90 P.P.M. |

EXAMPLE II

In the system shown in FIG. 3 a lithium chloride solution containing 40 percent lithium chloride, 0.23 percent sodium chloride and 0.06 percent dissolved lead is fed to evaporator-crystallizer 11 via line 10. Water is evaporated from the solution at the rate of 1,500 grams per hour with a volume of 16.7 liters of solution at a temperature of about 110°C. being maintained therein. 3.0 weight percent of the contents of evaporator-crystallizer 11 is continuously passed through line 12 to tank 18. In tank 18 $H_2S$ is continuously bubbled through the solution added thereto and 1.41 grams of lead as PbS is removed therefrom per hour through line 19. The solution removed from tank 18 is passed through line 21 to evaporator-crystallizer 11. This operation maintains in evaporator-crystallizer 11 a concentrated solution of lithium chloride containing 56 percent by weight lithium chloride, 0.39 percent sodium chloride and 0.3 percent dissolved lead. 13 percent by weight of the slurry in evaporator-crystallizer 11 per hour is passed to centrifuge 14 via line 16 where the liquor removed is recycled via line 13 to the evaporator-crystallizer 11. A crystal product of lithium chloride having the following composition is obtained:

|  | Wt. % |
|---|---|
| Lithium chloride | 99.4 |
| Sodium chloride | 0.58 |
| Lead | 90 P.P.M. |

While the invention has been described with reference to certain specific examples and illustrative embodiments, it is not intended that it be limited thereby except insofar as appears in the accompanying claims.

I claim:

1. In the process of manufacturing tetraalkyllead compound by reaction of lead, lithium and hydrocarbon halide in a reactor wherein the reactor product is contacted with water, an aqueous lithium halide solution containing contaminating quantities of dissolved lead is produced thereby and lithium halide is crystallized from the lead contaminated solution, the improvement which comprises conducting said crystallization of lithium halide from an aqueous lithium halide solution containing a lead concentration of 0.3 percent by weight or less and recovering a lithium halide crystalline product containing less than 100 parts per million lead.

2. The process of claim 1 wherein the lithium halide is lithium chloride.

3. In the process of manufacturing tetraalkyllead compound by reaction of lead, lithium and hydrocarbon chloride in a reactor wherein the reactor product is contacted with water, an aqueous lithium chloride solution containing contaminating quantities of dissolved lead is produced thereby and lithium chloride is crystallized from the lead contaminated solution, the improvement which comprises feeding lead contaminated aqueous lithium chloride solution to an evaporation zone, maintaining the lead concentration in the evaporation zone at 0.3 percent by weight or less by withdrawing a bleed stream of the solution in the evaporation zone and feeding withdrawn solution of the bleed stream to a treatment zone, adjusting the hydroxyl ion concentration of the solution in the treatment zone to between 2 and 8 milliequivalents per 100 grams of solution with acid selected from the group consisting of organic acid, hydrochloric acid, nitric acid and phosphoric acid to thereby precipitate dissolved lead, removing precipitated lead from the treatment zone, withdrawing solution from the treatment zone and returning it to the evaporation zone, evaporating water from the solution in the evaporation zone, crystallizing lithium chloride from the solution in the evaporation zone and recovering lithium chloride crystalline product containing less than 100 parts per million lead.

4. The process of claim 3 wherein the acid used is hydrochloric acid.

5. The process of claim 3 wherein the hydroxyl ion concentration is adjusted to between 2.8 and 4.5 milliequivalents per 100 grams of solution.

6. The process of claim 3 wherein the hydroxyl ion concentration of the solution withdrawn from the treatment zone is adjusted to a pH of about 7 before being returned to the evaporation zone.

7. The process of claim 3 wherein the hydroxyl ion concentration of the solution in the treatment zone is adjusted to a pH of 12.

8. The process of claim 3 wherein the solution in the evaporation zone is concentrated to a lithium chloride content of at least 56 percent by weight.

9. The process of claim 3 wherein the bleed stream is at least 5 percent by weight of the solution in the evaporation zone.

10. In the process of manufacturing tetraalkyllead compound by reaction of lead, lithium and hydrocarbon chloride in a reactor wherein the reactor product is contacted with water, an aqueous lithium chloride solution containing contaminating quantities of dissolved lead is produced thereby and lithium chloride is crystallized from the lead contaminated solution, the improvement which comprises feeding lead contaminated aqueous lithium chloride solution to an evaporation zone, maintaining the lead concentration in the evaporation zone at 0.3 percent by weight or less by withdrawing a bleed stream of the solution in the evaporation zone and feeding withdrawn solution of the bleed stream to a treatment zone, introducing a member selected from the group consisting of hydrogen sulfide and alkali metal sulfide into said treatment zone to thereby precipitate dissolved lead as lead sulfide, removing precipitated lead from the treatment zone, withdrawing solution from the treatment zone and returning it to the evaporation zone, evaporating water from the solution in the evaporation zone, crystallizing lithium chloride from the solution in the evaporation zone and recovering lithium chloride crystalline product containing less than 100 parts per million lead.

11. The process of claim 10 wherein the alkali metal sulfide is lithium sulfide.

12. The process of claim 10 wherein the solution in the evaporation zone is concentrated to a lithium chloride content of at least 56 percent by weight.

13. The process of claim 10 wherein the bleed stream is at least 5 percent by weight of the solution in the evaporation zone.

14. In the process of manufacturing tetraalkyllead compound by reaction of lead, lithium and hydrocarbon chloride in a reactor wherein the reactor product is contacted with water, an aqueous lithium chloride solution containing contaminating quantities of dissolved lead is produced thereby and lithium chloride is crystallized from the lead contaminated solution, the improvement which comprises feeding aqueous lithium chloride solution containing more than 0.4 percent by weight dissolved lead to an evaporation zone, maintaining the lead concentration in the evaporation zone at 0.3 percent by weight or less by withdrawing a bleed stream of the solution in the evaporation zone and feeding withdrawn solution of the bleed stream to a treatment zone, adjusting the hydroxyl ion concentration of the solution in the treatment zone to between 2 and 8 milliequivalents per 100 grams of solution with hydrochloric acid to thereby precipitate dissolved lead, removing precipitated lead from the treatment zone, withdrawing solution from the treatment zone, adjusting the pH thereof to about 7 and returning it to the evaporation zone, evaporating water from the solution in the evaporation zone until the solution is concentrated to a lithium chloride content of at least 56 percent by weight, crystallizing lithium chloride from the solution in the evaporation zone and recovering lithium chloride crystalline product containing less than 100 parts per million lead.

15. The process of claim 14 wherein the hydroxyl ion concentration is adjusted to between 2.8 and 4.5 milliequivalents per 100 grams of solution.

16. The process of claim 1 wherein the bleed stream is at least 5 percent by weight of the solution in the evaporation zone.

* * * * *